United States Patent
Aoyama

[11] Patent Number: 6,124,841
[45] Date of Patent: Sep. 26, 2000

[54] IMAGE SIZE ENLARGING AND REDUCING METHOD AND APPARATUS

[75] Inventor: Tatsuya Aoyama, Kanagawa-ken, Japan

[73] Assignee: Fuji Photo Film Co., Ltd., Kanagawa-Ken, Japan

[21] Appl. No.: 08/890,616

[22] Filed: Jul. 9, 1997

[30] Foreign Application Priority Data

Jul. 9, 1996 [JP] Japan ................................. 8-179343

[51] Int. Cl.⁷ .................................................. G09G 5/00
[52] U.S. Cl. ........................... 345/127; 345/129; 345/130
[58] Field of Search .................................. 345/127, 130, 345/129, 116, 439, 1; 348/581, 589

[56] References Cited

U.S. PATENT DOCUMENTS

| | | | |
|---|---|---|---|
| 4,684,935 | 8/1987 | Fujisaku et al. | 345/1 |
| 4,686,521 | 8/1987 | Beaven et al. | 345/22 |
| 5,048,105 | 9/1991 | Adachi | 382/47 |
| 5,206,931 | 4/1993 | Kimura et al. | 345/129 |
| 5,210,825 | 5/1993 | Kavaler | 345/116 |
| 5,243,447 | 9/1993 | Bodenkamp et al. | 345/116 |
| 5,291,185 | 3/1994 | Yoshimura | 345/116 |
| 5,467,142 | 11/1995 | Ichinokawa | 348/556 |

FOREIGN PATENT DOCUMENTS

| | | | |
|---|---|---|---|
| 0 753 828 | 7/1996 | European Pat. Off. | G06T 3/40 |
| 9-50516 | 2/1997 | Japan | G06T 3/40 |

Primary Examiner—Steven J. Saras
Assistant Examiner—Alecia D. Nelson
Attorney, Agent, or Firm—Sughrue, Mion, Zinn, Macpeak & Seas, PLLC

[57] ABSTRACT

In an image size enlarging and reducing method for obtaining a composed image of a desired size by combining at least two different images with each other, different image size enlarging or reducing processes are set for the images subjected to the image composition and in accordance with levels of sharpness required of the images. Before the image composition, the size of at least one image, which is among the images subjected to the image composition, is enlarged or reduced with an image size enlarging or reducing process, which corresponds to the image, such that the size of the image may become equal to the desired size.

13 Claims, 4 Drawing Sheets

IMAGE SIZE ENLARGING AND REDUCING METHOD AND APPARATUS

BACKGROUND OF THE INVENTION

1. Field of the Invention

This invention relates to an image size enlarging and reducing method and an apparatus for carrying out the method. This invention particularly relates to an image size enlarging and reducing method, wherein a plurality of images, which should satisfy different requirements for sharpness, are combined with one another, and wherein a composed image having a desired size is thereby obtained, and an apparatus for carrying out the method.

2. Description of the Prior Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields.

Also, it has been proposed to use stimulable phosphors in radiation image recording and reproducing systems. Specifically, a medical radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material, such as photographic material, or on a display device, such as a cathode ray tube (CRT) display device.

The visible image for diagnosis, which is reproduced from an image signal obtained in the manner described above, is often used as a composed image, which is obtained by combining at least two different images with each other. For example, an image of a human body and a character image representing the date, on which the image of the human body was recorded, the characteristics of the recorded image of the human body, or the like, may be combined with each other. Also, a plurality of images of a portion of a human body, which were recorded from various different directions, may be arrayed in a composed image. Further, images of a plurality of related portions of a human body may be arrayed in a composed image. In order for such a composed image to be obtained, techniques have heretofore been employed, wherein a single predetermined process for enlarging or reducing the image size is selected previously, the sizes of the images subjected to the image composition are enlarged or reduced with the image size enlarging or reducing process in order to match the image sizes, and the images are then combined with one another. When necessary, the size of the thus obtained composed image is then enlarged or reduced.

Ordinarily, the enlargement or reduction of the image size is carried out by making various calculations on a first image signal, thereby obtaining a second image signal suitable for reproducing an image of a desired size, and reproducing a visible image from the second image signal. In such cases, the sharpness of the reproduced image depends markedly upon the process for obtaining the second image signal.

Therefore, when the image size is enlarged or reduced, an appropriate image size enlarging or reducing process should preferably be employed in accordance with the level of sharpness required of the image. In particular, an interpolating operation process, which is employed for the enlargement of the image size, has a large influence upon the image quality of the image obtained from the image size enlargement. Therefore, an appropriate interpolating operation process should preferably be employed in accordance with the level of sharpness required of the image. The applicant has proposed various interpolating operation processes in, for example, U.S. Pat. No. 5,048,105, EP 753 828 A2 and Japanese Unexamined Patent Publication No. 9(1997)-50516.

However, in cases where the image size enlargement or reduction is carried out on a plurality of images of different kinds, the level of sharpness required of the image varies for different images. Therefore, with the conventional technique, wherein the sizes of the images are enlarged or reduced with a single selected image size enlarging or reducing process, the selected image size enlarging or reducing process cannot satisfy the sharpness requirements of all images. As a result, the problems occur in that an image, which has low image quality and does not satisfy the sharpness requirement, is obtained from the image size enlargement or reduction. For example, in cases where a character image, which should have a high level of sharpness, and an image of a human body, which should be smooth, are enlarged or reduced, if an image size enlarging or reducing process appropriate for the character image is selected, the level of sharpness of the image of the human body will also become high. If an image size enlarging or reducing process appropriate for the image of the human body is selected, the character image will become unsharp.

SUMMARY OF THE INVENTION

The primary object of the present invention is to provide an image size enlarging and reducing method, wherein a composed image of a desired size is obtained from a plurality of images, which should satisfy different requirements for sharpness, such that a sharpness requirement of each image may be satisfied.

Another object of the present invention is to provide an apparatus for carrying out the image size enlarging and reducing method.

The present invention provides a first image size enlarging and reducing method, wherein at least two different images are combined with each other, and a composed image of a desired size is thereby obtained, the method comprising the steps of:

i) setting different image size enlarging or reducing processes for the images subjected to the image composition, the different image size enlarging or reducing processes being in accordance with levels of sharpness required of the images, and ii) enlarging or reducing the size of at least one image, which is among the images subjected to the image composition, with an image size enlarging or reducing process, which corresponds to the image, such that the size of the image may become equal to the desired size, the enlargement or reduction of the size of the image being carried out before the image composition.

The present invention also provides a second image size enlarging and reducing method, wherein at least two different images are combined with each other, and a composed image of a desired size is thereby obtained, the method comprising the steps of:

i) setting different image size enlarging or reducing processes for the images subjected to the image composition, the different image size enlarging or reducing processes being in accordance with levels of sharpness required of the images, ii) enlarging or reducing the size of at least one image, which is among the images subjected to the image composition, with an image size enlarging or reducing process, which corresponds to the image, such that the size of the image may become equal to a size, which is different from the desired size, iii) carrying out the image composition, and iv) enlarging or reducing the size of the image, which has been obtained from the image composition, such that the size of the image may become equal to the desired size.

The present invention further provides an image size enlarging and reducing apparatus, wherein at least two different images are combined with each other, and a composed image of a desired size is thereby obtained, the apparatus comprising:

i) an image size enlarging or reducing means, in which different image size enlarging or reducing processes are set for the images subjected to the image composition, the different image size enlarging or reducing processes being in accordance with levels of sharpness required of the images, the image size enlarging or reducing means enlarging or reducing the size of at least one image, which is among the images subjected to the image composition, with an image size enlarging or reducing process, which corresponds to the image, such that the size of the image may become equal to the desired size or a size, which is different from the desired size, and ii) an image composing means for carrying out the image composition in which, as for an image of a size having not been enlarged or reduced by the image size enlarging or reducing means, the image of the size having not been enlarged or reduced is used, and in which, as for the image of the size having been enlarged or reduced by the image size enlarging or reducing means, the image of the size having been enlarged or reduced is used.

The image size enlarging and reducing apparatus in accordance with the present invention may further comprise a post-composition image size enlarging or reducing means for enlarging or reducing the size of the image, which has been obtained from the image composition carried out by the image composing means.

The image size enlarging and reducing apparatus in accordance with the present invention may still further comprise an adjustment means for adjusting the image size enlarging or reducing process, which is carried out by the image size enlarging or reducing means, in accordance with a level of sharpness required of the image, which is enlarged or reduced in size by the image size enlarging or reducing means.

The term "setting different image size enlarging or reducing processes for images in accordance with levels of sharpness required of the images" as used herein means that, in cases where three or more images are subjected to the image composition, different image size enlarging or reducing processes may be set for at least two images among the three or more images. Different image size enlarging or reducing processes need not necessarily be set for all of the images subjected to the image composition.

Also, each of the image size enlarging or reducing processes may comprise an image size enlarging step alone, an image size reducing step alone, or both of the image size enlarging step and the image size reducing step.

With the first and second image size enlarging and reducing methods in accordance with the present invention, wherein a composed image of a desired size is obtained by combining at least two different images with each other, different image size enlarging or reducing processes are set for the images, which are subjected to the image composition, in accordance with the levels of sharpness required of the images. Before the images are combined with each other, the size of each image is enlarged or reduced with the image size enlarging or reducing process, which corresponds to the image, i.e. which has been set for the image. Therefore, the image having been enlarged or reduced in size satisfies the sharpness requirement and has good image quality. Accordingly, as the composed image obtained from such images, an image in which every portion has been reproduced with an appropriate level of sharpness can be obtained.

Also, with the second image size enlarging and reducing method in accordance with the present invention, in cases where one of the image size enlarging or reducing processes has the characteristics such that the image size enlargement or reduction can be carried out only with discrete image size enlargement or reduction scale factors and a desired image size enlargement or reduction scale factor cannot be employed, each image may be enlarged or reduced in size with a discrete image size enlargement or reduction scale factor, and a composed image may thereby be obtained. Thereafter, the size of the composed image may be enlarged or reduced with an arbitrary image size enlargement or reduction scale factor by using a different image size enlarging or reducing process. In this manner, a composed image, which has a desired size and in which every portion has been reproduced with an appropriate level of sharpness, can be obtained.

With the image size enlarging and reducing apparatus in accordance with the present invention, which comprises the image size enlarging or reducing means for carrying out the processes described above and the image composing means, the first and second image size enlarging and reducing methods in accordance with the present invention can be carried out appropriately. Therefore, a composed image, in which every portion has been reproduced with an appropriate level of sharpness, can be obtained.

Also, with the image size enlarging and reducing apparatus in accordance with the present invention, which is provided with the post-composition image size enlarging or reducing means for enlarging or reducing the size of the image having been obtained from the image composition carried out by the image composing means, a composed image, which has a desired size and in which every portion has been reproduced with an appropriate level of sharpness, can be obtained.

Further, with the image size enlarging and reducing apparatus in accordance with the present invention, wherein the adjustment means is employed for adjusting the image size enlarging or reducing process, which is carried out by the image size enlarging or reducing means, in accordance with a level of sharpness required of the image, which is enlarged or reduced in size by the image size enlarging or reducing means, a composed image can be obtained by utilizing an image size enlarging or reducing process that is optimum for each image.

DESCRIPTION OF THE PREFERRED EMBODIMENTS

The present invention will hereinbelow be described in further detail with reference to the accompanying drawings.

Figure 1:
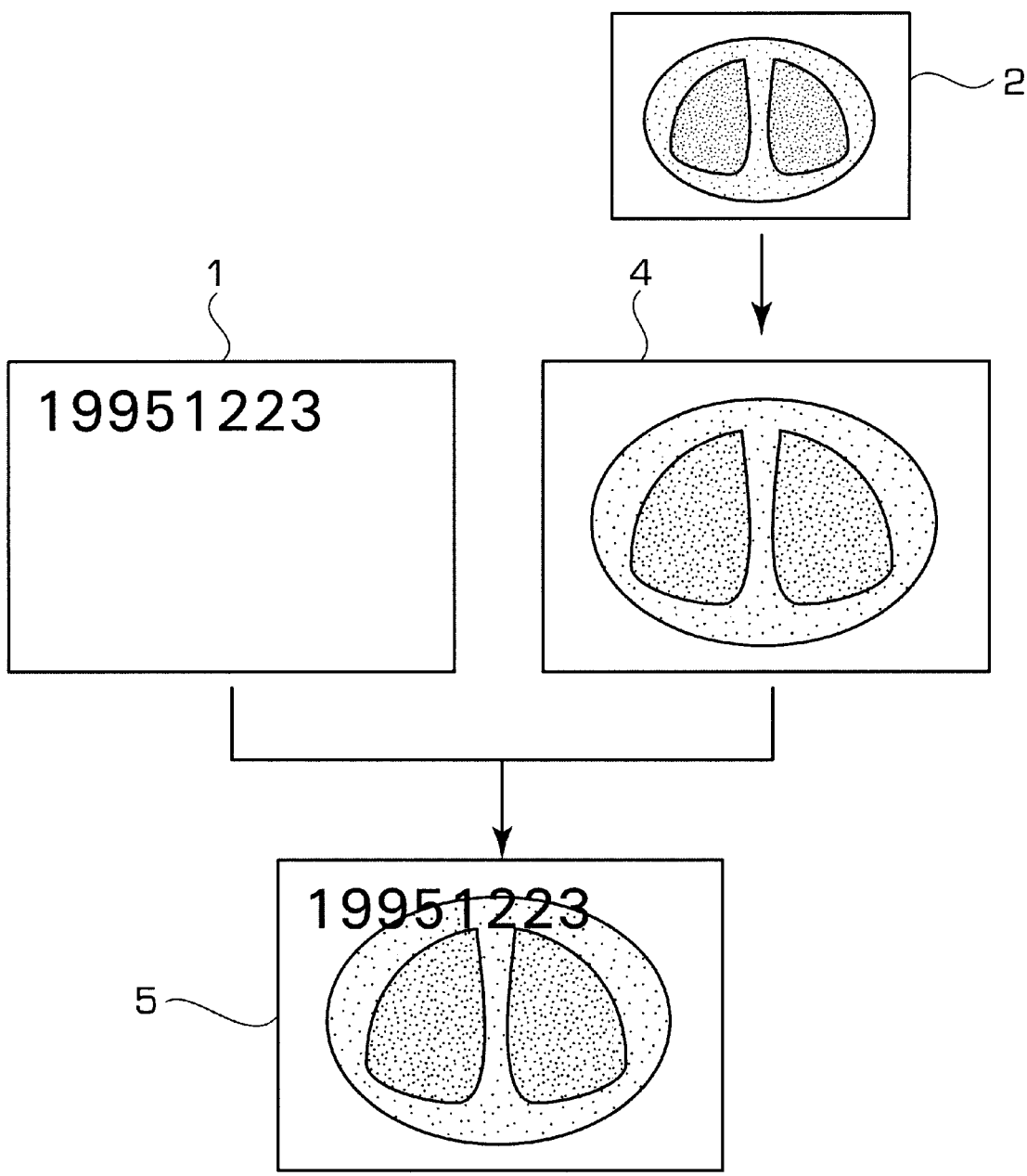
FIG. 1 is an explanatory view showing an embodiment of the image size enlarging and reducing method in accordance with the present invention.
Figure 2:
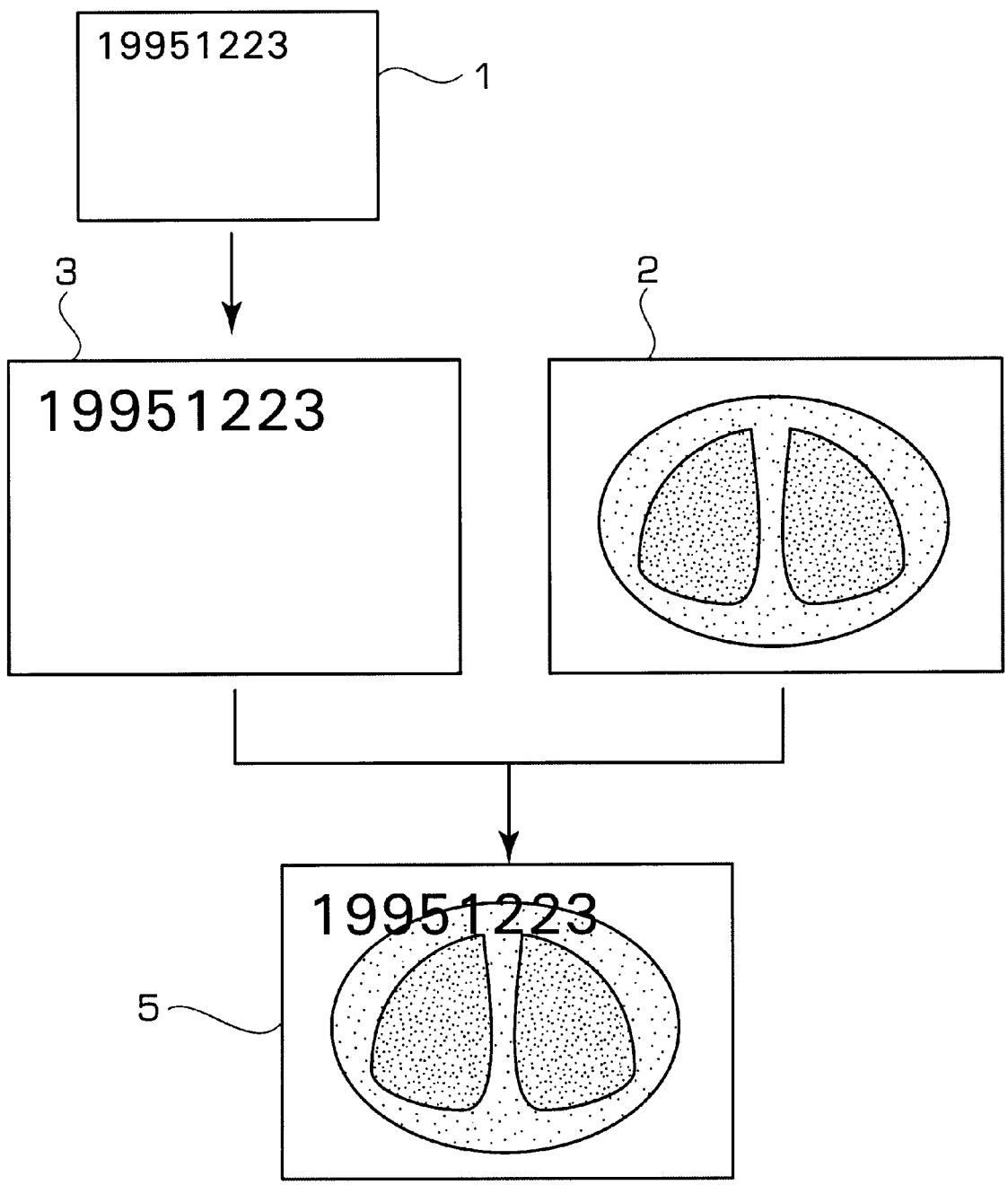
FIG. 2 is an explanatory view showing a different embodiment of the image size enlarging and reducing method in accordance with the present invention.
Figure 3:
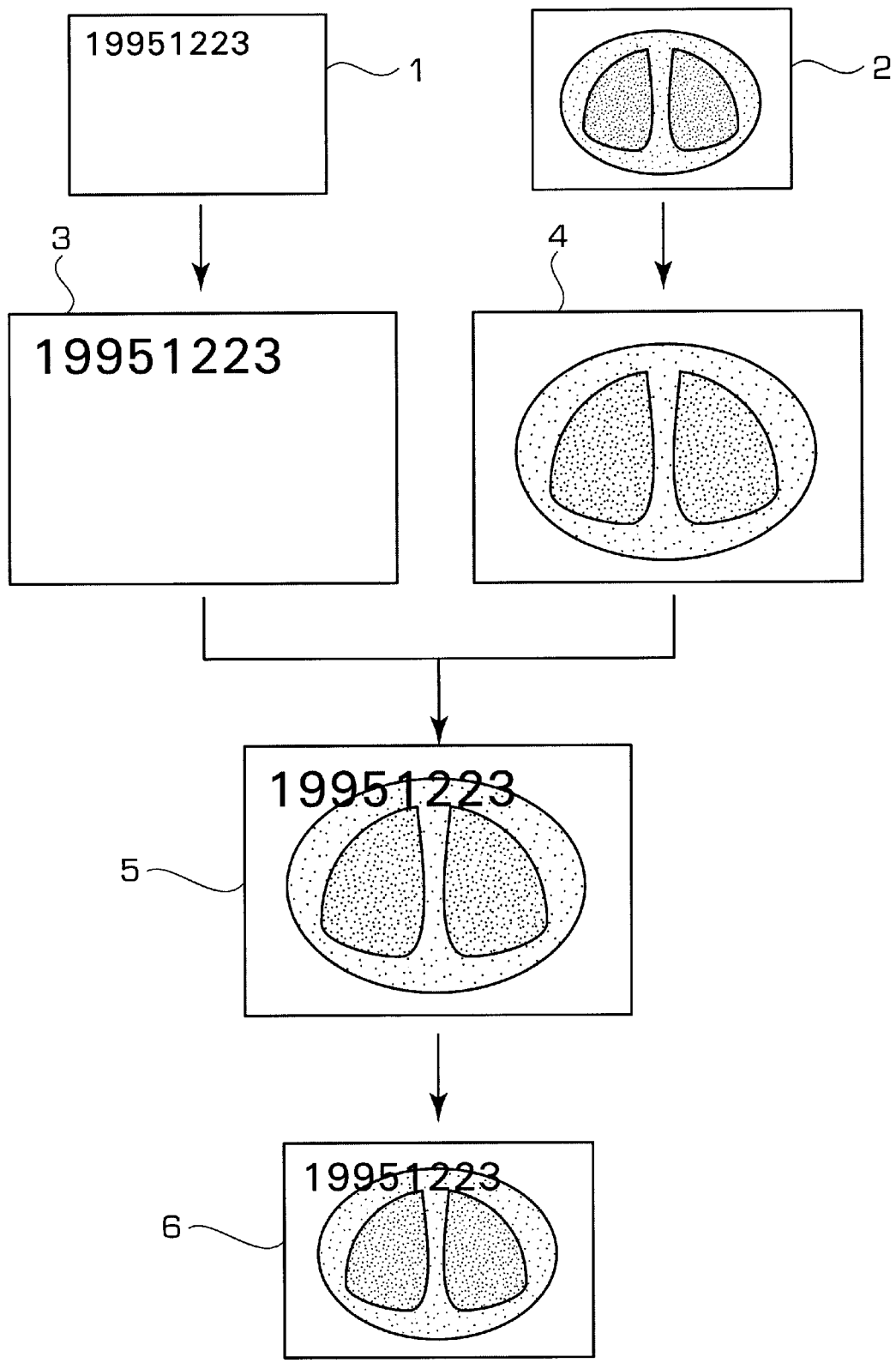
FIG. 3 is an explanatory view showing a further different embodiment of the image size enlarging and reducing method in accordance with the present invention.

FIGS. 1, 2, and 3 show embodiments of the image size enlarging and reducing method in accordance with the present invention.

In the embodiments of FIGS. 1, 2, and 3, an original lung image (an original object image) 2, and an original character image 1 representing the date, on which the original lung image 2 was recorded, are combined with each other, and a composed image having a desired size is thereby obtained. Different image size enlarging or reducing processes are set for the original character image 1 and the original lung image 2 and in accordance with the levels of sharpness required of the original character image 1 and the original lung image 2. The size of at least either one of the original character image 1 and the original lung image 2 is enlarged or reduced with an image size enlarging or reducing process, which corresponds to the image.

As the image size enlarging or reducing processes, as for the original lung image 2, a process suitable for the enlargement of the image sizes of lung images is set. Ordinarily, as for images of the internal organs of a human body, which images are to be used in making a diagnosis, smoothness is required. Therefore, as for the original lung image 2, any of image size enlarging processes, with which the image size enlargement can be carried out such that a resulting enlarged lung image 4 may be smooth (i.e., may have a low level of sharpness), maybe set. Ordinarily, the image size enlargement is carried out by interpolating a new image signal component from original image signal components, which surround adjacent original image signal components, and inserting the new image signal component between the adjacent original image signal components. It has been known that, in such cases, the interpolating operation process which is utilized (specifically a process with which the surrounding original image signal components are selected, a calculation formula for calculating the value of the interpolated image signal component, and the like) affects the image sharpness. Therefore, as the image size enlarging process for the original lung image 2, it is necessary for an interpolating operation process, which is suitable for obtaining a smooth image, to be set. In the embodiments of the image size enlarging and reducing method in accordance with the present invention, a cubic spline interpolating operation process is set as the interpolating operation process.

With the cubic spline interpolating operation process, the original image signal components in each section are connected with each other by a third-order function, and the value of the third-order function corresponding to a position, at which an interpolation point is set, is taken as the value of the interpolated image signal component. Alternatively, any of other interpolating operation processes, which can satisfy the smoothness requirements of the enlarged image, may be employed.

As the image size enlarging or reducing process for the original character image 1, an image size enlarging process, which is different from the image size enlarging or reducing process having been set for the original lung image 2 and is suitable for the enlargement of the image sizes of character images, is set. It is desired that character images have a comparatively high level of sharpness, and therefore any of image size enlarging processes, which can satisfy such requirements, may be set. In the embodiments of the image size enlarging and reducing method in accordance with the present invention, a nearest neighbor interpolation process is set for the original character image 1. With the nearest neighbor interpolation process, as the value of the interpolated image signal component corresponding to an interpolation picture element, the value of the original image signal component representing a picture element, which is located at the position nearest to the interpolation picture element, is employed. It has been known that, with the nearest neighbor interpolation process, in cases where the size of the interpolation image, which is obtained from the interpolating operation, is integral multiples of the size of the original image, a high level of image sharpness and good image quality can be obtained. Therefore, in cases where the size of the original lung image 2 is integral multiples of the size of the original character image 1, the character pattern embedded in a composed image 5 can be reproduced with an appropriate level of sharpness.

Each of the embodiments shown in FIGS. 1, 2, and 3 will be described hereinbelow.

In the embodiment of FIG. 1, the size of the original lung image 2 alone is enlarged. Specifically, the original lung image 2 and the original character image 1 having a size larger than the size of the original lung image 2 and representing the date, on which the original lung image 2 was recorded, are subjected to the image composition, and the composed image 5 is obtained from the image composition. More specifically, the size of the original lung image 2 alone is enlarged by using the cubic spline interpolating operation process, which is an example of the image size enlarging process capable of satisfying the sharpness requirement of the original lung image 2 and has been set for the original lung image 2. In this manner, the enlarged lung image 4 having the same size as the size of the original character image 1 is obtained. Thereafter, the enlarged lung image 4 and the original character image 1 are combined with each other, and the composed image 5 having a predetermined size is thereby obtained.

In the embodiment of FIG. 2, the size of the original character image 1 alone is enlarged. Specifically, the original lung image 2 and the original character image 1 having a size smaller than the size of the original lung image 2 are subjected to the image composition, and the composed image 5 is obtained from the image composition. More specifically, the size of the original character image 1 alone is enlarged by using the nearest neighbor interpolation process, which is an example of the image size enlarging process capable of satisfying the sharpness requirement of the original character image 1 and has been set for the original character image 1. In this manner, an enlarged character image 3 having the same size as the size of the original lung image 2 is obtained. Thereafter, the enlarged character image 3 and the original lung image 2 are combined with each other, and the composed image 5 having a predetermined size is thereby obtained.

In the embodiment of FIG. 3, both of the size of the original character image 1 and the size of the original lung image 2 are enlarged, and the two enlarged images are combined with each other in order to obtain the composed image 5. Specifically, the size of the original character image 1 is enlarged by using the nearest neighbor interpolation process, which has been set for the original character image 1. In this manner, the enlarged character image 3 having a predetermined size is obtained. Also, the size of the original lung image 2 is enlarged by using the cubic spline interpolating operation process, which has been set for the original lung image 2. In this manner, the enlarged lung image 4 having the same size as the size of the enlarged character image 3 is obtained. Thereafter, the enlarged character image 3 and the enlarged lung image 4 are combined with each other, and the composed image 5 having a predetermined size is thereby obtained.

As described above, the nearest neighbor interpolation process can provide a very good level of sharpness in cases where the size of an image is enlarged to integral multiples. Therefore, in cases where the size of the enlarged character image 3 to be obtained ultimately is integral multiples of the size of the original character image 1, no problem occurs with the image quality of the enlarged character image 3 obtained from the nearest neighbor interpolation process. However, in cases where the size of the enlarged character image 3 to be obtained ultimately is non-integral multiples of the size of the original character image 1, if the size of the original character image 1 is enlarged to non-integral multiples, an enlarged image having good image quality cannot be obtained.

Therefore, in such cases, as illustrated in FIG. 3, firstly, the size of the original character image 1 is enlarged to a predetermined integral multiple by using the nearest neighbor interpolation process, and the enlarged character image 3 is thereby obtained. Also, the original lung image 2 is enlarged to the same size as the size of the enlarged character image 3 by using the cubic spline interpolating operation process, and the enlarged lung image 4 is thereby obtained. The enlarged character image 3 and the enlarged lung image 4 are then combined with each other, and the composed image 5 is thereby obtained. Thereafter, the composed image 5 is taken as an intermediate processed image, and its size is enlarged or reduced to the ultimately necessary size by using a process, which is capable of enlarging or reducing the image size with an arbitrary image size enlargement or reduction scale factor. In this manner, a composed image 6 having the ultimately necessary size is obtained. Specifically, for example, in cases where the composed image 6 having a size 3.8 times as large as the size of the original character image 1 is to be obtained, the original character image 1 is firstly enlarged to a size 4 times as large as its size by using the nearest neighbor interpolation process, and enlarged character image 3 is thereby obtained. Also, when necessary, the original lung image 2 is enlarged to the same size as the size of the enlarged character image 3 by using the cubic spline interpolating operation process, and the enlarged lung image 4 is thereby obtained. The composed image 5 is then obtained from the enlarged character image 3 and the enlarged lung image 4. Thereafter, the size of the composed image 5 is reduced to the size 3.8 times as large as the size of the original character image 1, and the composed image 6 having the desired size is thus obtained.

In this example, the image size enlargement scale factor of the composed image 5 with respect to the original character image 1 is set to be 4, which is an integral scale factor nearest to 3.8. In such cases, the largest possible effects can be obtained from the nearest neighbor interpolation process. For the image size enlargement or reduction from the composed image 5 to the composed image 6, a process capable of approximately satisfying the requirements of all images constituting the composed image 5. Therefore, the process employed will not necessarily be optimum for all of the images constituting the composed image. However, the effects of the image size enlarging and reducing method in accordance with the present invention can be obtained sufficiently by setting the image size enlargement scale factor of the composed image 5 with respect to the original character image 1 to be a value close to the ultimately desired scale factor. Therefore, no limitation is imposed upon the image size enlarging or reducing process, which is carried out after the image composition.

An embodiment of the image size enlarging and reducing apparatus for carrying out the aforesaid image size enlarging and reducing method in accordance with the present invention will be described hereinbelow.

Figure 4:
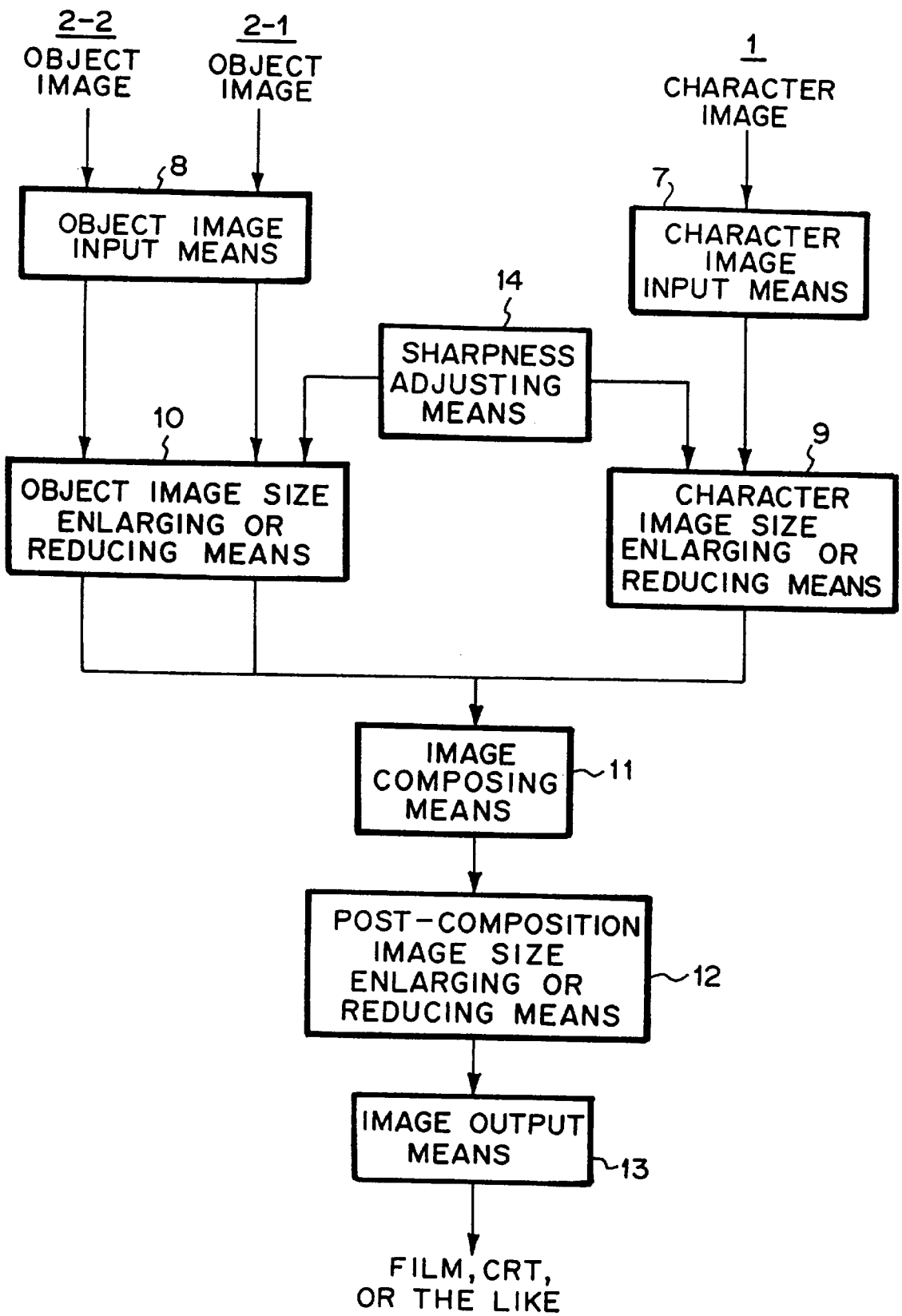
FIG. 4 is a block diagram showing an embodiment of the image size enlarging and reducing apparatus in accordance with the present invention.

FIG. 4 is a block diagram showing an embodiment of the image size enlarging and reducing apparatus in accordance with the present invention. In this embodiment, a composed image having a desired size is obtained from an original character image 1 and an original human body image (an original object image) 2. An image signal representing the original character image 1 is inputted from a character image input means 7 into the apparatus. An image signal representing the original object image 2 is inputted from an object image input means 8 into the apparatus. By way of example, the input means may be an image read-out apparatus, such as an image scanner, an image signal storage medium, such as a floppy disk or a hard disk, or means for converting the character information, which is inputted from a keyboard, or the like, into an image signal. In cases where the image size enlarging and reducing apparatus in accordance with the present invention is not used as an independent apparatus for carrying out only the image size enlargement and reduction, and is used as a portion of a system containing an image recording means, and the like, the term "input by an input means" as used herein means the transfer of the image signal from the means for carrying out the processing before the image size enlarging or reducing process.

The original character image 1 having been inputted from the character image input means 7 is enlarged or reduced in size with an image size enlarging or reducing process, which is appropriate for the original character image 1, by a character image size enlarging or reducing means 9. Also, the original object image 2 having been inputted from the object image input means 8 is enlarged or reduced in size with an image size enlarging or reducing process, which is appropriate for the original object image 2, by an object image size enlarging or reducing means 10. In such image size enlarging or reducing processes, in cases where the level of sharpness required of the image is constant as in a character image, an interpolating operation formula, or the like, may be set previously as an intrinsic one. However, in the cases of object images, the sharpness requirements of the images vary for different portions of the object, the images of which are recorded. In this embodiment, such cases are considered, and a sharpness adjusting means 14 for altering various setting values is provided. The images, which have been enlarged or reduced in size by the character image size enlarging or reducing means 9 and the object image size enlarging or reducing means 10, are combined with each other by an image composing means 11. In cases where it is necessary for the image size enlargement or reduction to be carried out even further as in the aforesaid third embodiment of FIG. 3, the composed image having been obtained from the image composing means 11 is processed by a post-composition image size enlarging or reducing means 12. The thus obtained image is reproduced as a visible image on photographic film, a CRT display device, or the like, by an image output means 13.

In the embodiment of FIG. 4, the character image size enlarging or reducing means 9 and the object image size enlarging or reducing means 10 are provided as two independent means. However, in cases where the adjustment with the sharpness adjusting means 14 is carried out, the character image size enlarging or reducing means 9 and the object image size enlarging or reducing means 10 need not necessarily be provided as two independent means, and may be provided as a single means. Also, in cases where a plurality of human body images, which should satisfy different requirements for sharpness, are to be combined with one another, a single image size enlarging or reducing means may be operated in various different modes by using the sharpness adjusting means 14. For example, in cases where the human body images contain a lung image and a liver image, a comparatively high level of sharpness is required of the lung image, and a comparatively low level of sharpness is required of the liver image. Thus in cases where the image size enlargement or reduction is to be carried out on an object image 2-1 and an object image 2-2, which should satisfy different requirements for sharpness, the sharpness adjusting means 14 may be utilized, and the image size enlarging or reducing process appropriate for the object image 2-1 may be firstly set in the object image size enlarging or reducing means 10. In this manner, in the object image size enlarging or reducing means 10, the image size enlarging or reducing process appropriate for the object image 2-1 may be carried out on the object image 2-1. The thus obtained image may be transferred to the image composing means 11. Thereafter, by the utilization of the sharpness adjusting means 14, the image size enlarging or reducing process appropriate for the object image 2-2 may be set in the object image size enlarging or reducing means 10. In the object image size enlarging or reducing means 10, the image size enlarging or reducing process appropriate for the object image 2-2 may be carried out on the object image 2-2. The thus obtained image may be transferred to the image composing means 11. The two images may then be combined with each other in the image composing means 11.

In the manner described above, with the image size enlarging and reducing method in accordance with the present invention, a plurality of images, which should satisfy different requirements for sharpness, can be appropriately combined with one another, and a composed image, which has a desired size and in which every portion has been reproduced with an appropriate level of sharpness, can thereby be obtained.

In the aforesaid embodiments of the image size enlarging and reducing method and apparatus in accordance with the present invention, the sizes of the images are enlarged before the image composition. In cases where the sizes of the images are to be reduced before the image composition, an image size reducing process appropriate for each image can be set, and the image size reduction can be carried out basically in the same manner as that described above.

What is claimed is:

1. An image size enlarging and reducing method, wherein at least two different images are combined with each other to produce a composed image having a desired size, the method comprising:

i) setting a corresponding image size enlarging or reducing process for each of said at least two different images that require enlargement or reduction;

wherein said corresponding image size enlarging or reducing process is selected from a plurality of image size enlarging or reducing processes, based on a required level of sharpness of each of said at least two different images that require enlargement or reduction; or wherein said corresponding image size enlarging or reducing process is adjusted to satisfy said required level of sharpness of each of said at least two different images that require enlargement or reduction; and ii) enlarging or reducing a size of at least one of said at least two different images using said corresponding image size enlarging or reducing process, wherein said size of said at least one of said at least two different images is enlarged or reduced to equal said desired size, wherein said enlarging or reducing of said size of said at least one of said at least two different images is carried out before said composed image is produced.

2. An image size enlarging and reducing method as defined in claim 1 wherein at least one of said at least two different images is a radiation image of an object.

3. An image size enlarging and reducing method, wherein at least two different images are combined with each other to produce a composed image having a desired size, the method comprising:

i) setting a corresponding image size enlarging or reducing process for each of said at least two different images that require enlargement or reduction;

wherein said corresponding image size enlarging or reducing process is selected from a plurality of image size enlarging or reducing processes, based on a required level of sharpness of each of said at least two different images that require enlargement or reduction; or wherein said corresponding image size enlarging or reducing process is adjusted to satisfy said required level of sharpness of each of said at least two different images that require enlargement or reduction;

ii) enlarging or reducing a size of at least one of said at least two different images using said corresponding image size enlarging or reducing process, wherein said size of said at least one of said at least two different images is enlarged or reduced to equal an intermediate size, which is different from said desired size;

iii) combining said at least two different images with each other to produce said composed image having said intermediate size; and iv) enlarging or reducing said intermediate size of said composed image to produce said composed image having said desired size.

4. An image size enlarging and reducing method as defined in claim 3 wherein at least one of said at least two different images is a radiation image of an object.

5. An image size enlarging and reducing apparatus, wherein at least two different images are combined with each other to produce a composed image having a desired size, the apparatus comprising:

i) an image size enlarging or reducing means for setting a corresponding image size enlarging or reducing process for each of said at least two different images that require enlargement or reduction, wherein said image size enlarging or reducing means enlarges or reduces a size of at least one of said at least two different images using said corresponding image size enlarging or reducing process, wherein said size of said at least one of said at least two different images is enlarged or reduced to equal either said desired size or an intermediate size different from said desired size;

wherein said corresponding image size enlarging or reducing process is selected from a plurality of image size enlarging or reducing processes, based on a required level of sharpness of each of said at least two different images that require enlargement or reduction; or wherein said corresponding image size enlarging or reducing process is adjusted to satisfy said required level of sharpness of each of said at least two different images that require enlargement or reduction; and ii) an image composing means for combining said at least two different images, wherein said at least two different images combined by said image composing means must include said at least one of said at least two different images that has been enlarged or reduced by said image size enlarging or reducing means, and may include an original size image of said at least two different images that was not enlarged or reduced by said image size enlarging or reducing means.

6. An image size enlarging and reducing apparatus as defined in claim 5 further comprising:

a post-composition image size enlarging or reducing means for enlarging or reducing the size of said composed image, which has been produced by said image composing means.

7. An image size enlarging and reducing apparatus as defined in claim 5 further comprising:

an adjustment means for adjusting said corresponding image size enlarging or reducing process in accordance with a level of sharpness required of said at least one of said at least two different images, which is enlarged or reduced in size by said image size enlarging or reducing means.

8. An image size enlarging and reducing apparatus as defined in claim 5 wherein at least one of said at least two different images is a radiation image of an object.

9. An image size enlarging and reducing apparatus, wherein at least two different images are combined with each other to produce a composed image having a desired size, the apparatus comprising:

an image size enlarging/reducing process setting unit for setting a corresponding image size enlarging/reducing process for at least one of said at least two different images that require enlargement or reduction;

wherein said corresponding image size enlarging/reducing process is selected from a plurality of image size enlarging/reducing processes, based on a required level of sharpness of said at least one of said at least two different images that require enlargement or reduction; or wherein said corresponding image size enlarging/reducing process is adjusted to satisfy said required level of sharpness of said at least one of said at least two different images;

an image size enlarging/reducing unit which enlarges or reduces a size of said at least one of said at least two different images using said corresponding image size enlarging/reducing process, wherein said size of said at least one of said at least two different images is enlarged or reduced to equal said desired size, or an intermediate size different from said desired size; and an image composition unit that combines said at least two different images to produce said composed image.

10. An image size enlarging and reducing apparatus as defined in claim 9 wherein said at least two different images combined by said image composition unit includes said at least one of said at least two different images which has been enlarged or reduced by said image size enlarging/reducing unit, and includes an original size image of said at least two different images which was not enlarged or reduced by said image size enlarging/reducing unit.

11. An image size enlarging and reducing apparatus as defined in claim 9 wherein said size of said at least one of said at least two different images is enlarged or reduced to equal said intermediate size, wherein said image composition unit combines said at least two different images to produce said composed image having said intermediate size, and wherein said apparatus further comprises:

a post-composition image size enlarging/reducing unit that enlarges or reduces said intermediate size of said composed image to produce said composed image having said desired size.

12. An image size enlarging and reducing apparatus as defined in claim 9, further comprising:

a sharpness adjustment unit that adjusts said corresponding image size enlarging/reducing process in accordance with the level of sharpness required of said at least one of said at least two different images.

13. An image size enlarging and reducing apparatus as defined in claim 9 wherein at least one of said at least two different images is a radiation image of an object.

\* \* \* \* \*